United States Patent
Hosie

(10) Patent No.: US 10,740,452 B2
(45) Date of Patent: Aug. 11, 2020

(54) CALL PATH DEPENDENT AUTHENTICATION

(71) Applicant: ARM LIMITED, Cambridge (GB)

(72) Inventor: Simon Hosie, Santa Clara, CA (US)

(73) Assignee: ARM Limited, Cambridge (GB)

( * ) Notice: Subject to any disclaimer, the term of this patent is extended or adjusted under 35 U.S.C. 154(b) by 138 days.

(21) Appl. No.: 15/705,605

(22) Filed: Sep. 15, 2017

(65) Prior Publication Data
US 2019/0087566 A1   Mar. 21, 2019

(51) Int. Cl.
| | |
|---|---|
| *H04L 29/06* | (2006.01) |
| *G06F 21/42* | (2013.01) |
| *G06F 21/54* | (2013.01) |
| *G06F 21/64* | (2013.01) |
| *G06F 21/55* | (2013.01) |
| *G06F 21/12* | (2013.01) |
| *G06F 21/44* | (2013.01) |
| *G06F 21/62* | (2013.01) |

(52) U.S. Cl.
CPC ............ *G06F 21/42* (2013.01); *G06F 21/125* (2013.01); *G06F 21/44* (2013.01); *G06F 21/54* (2013.01); *G06F 21/552* (2013.01); *G06F 21/62* (2013.01); *G06F 21/64* (2013.01)

(58) Field of Classification Search
CPC ..................................................... G06F 21/64
See application file for complete search history.

(56) References Cited

U.S. PATENT DOCUMENTS

| | | | | |
|---|---|---|---|---|
| 7,020,772 | B2 * | 3/2006 | England | G06F 12/1491 |
| | | | | 711/163 |
| 9,361,242 | B2 | 6/2016 | Manoukian | |
| 9,424,203 | B2 | 8/2016 | Manoukian | |
| 2005/0144606 | A1 | 6/2005 | Li | |
| 2006/0253837 | A1 | 11/2006 | Hudson et al. | |
| 2007/0169085 | A1 | 7/2007 | Griep | |
| 2007/0277024 | A1 * | 11/2007 | Drepper | G06F 12/1408 |
| | | | | 712/238 |
| 2009/0055813 | A1 | 2/2009 | Haber | |
| 2009/0144309 | A1 * | 6/2009 | Cabrera Escandell | |
| | | | | G06F 21/54 |
| 2014/0380468 | A1 | 12/2014 | Gerzon et al. | |

(Continued)

OTHER PUBLICATIONS

UK Combined Search and Examination Report dated Nov. 3, 2016 in GB 1610026.5, 6 pages.

(Continued)

*Primary Examiner* — Taghi T Arani
*Assistant Examiner* — Lin Chang
(74) *Attorney, Agent, or Firm* — Nixon & Vanderhye P.C.

(57) ABSTRACT

A call path identifier is maintained which is permuted in response to a calling instruction for calling a target function, based on a function return address. The call path identifier is used as a modifier value for authentication code generating and checking instructions for generating and checking authentication codes associated with source values. In response to the authentication code checking instruction, if an expected authentication code mismatches a previously generated authentication code for a source value then an error handling response is triggered. This is useful for preventing attacks where address pointers which are valid in one part of the code are attempted to be reused in other parts of code.

19 Claims, 10 Drawing Sheets

(56) References Cited

U.S. PATENT DOCUMENTS

| | | | | |
|---|---|---|---|---|
| 2015/0302195 | A1* | 10/2015 | Acar | G06F 21/54 |
| | | | | 726/23 |
| 2016/0094552 | A1* | 3/2016 | Durham | G06F 21/00 |
| | | | | 713/171 |
| 2016/0110545 | A1* | 4/2016 | Acar | G06F 21/554 |
| | | | | 726/23 |
| 2016/0224784 | A1* | 8/2016 | Krishnaswamy | G06F 21/52 |
| 2016/0381050 | A1 | 12/2016 | Shanbhogue et al. | |
| 2017/0180567 | A1 | 6/2017 | Sharma | |

OTHER PUBLICATIONS

R. Bedichek, "Some Efficient Architecture Simulation Techniques", 1990, USENIX Conference, 12 pages.

J. Jean et al., "Tweaks and Keys for Block Ciphers: the TWEAKEY Framework", International Conference on the Theory and Application of Cryptology and Information Security, Dec. 2014, 18 pages.

J. Borghoff et al., "PRINCE—A Low-latency Block Cipher for Pervasive Computing Applications", ASIACRYPT'12, Dec. 2-6, 2012, 25 pages.

Qualcomm, Pointer Authentication on ARMv8.3, Design and Analysis of the New Software Security Instructions, Qualcomm Technologies, Inc., Jan. 10, 2017, 12 pages.

U.S. Appl. No. 15/076,903, filed Mar. 22, 2016, Inventor: Hosie.

International Search Report and Written Opinion of the International Searching Authority dated Oct. 9, 2018 in PCT/GB2018/052293, 13 pages.

Notice of Allowance dated Feb. 22, 2018 in co-pending U.S. Appl. No. 15/076,903, 17 pages.

\* cited by examiner

CSH PUSH

CSH POP

PERMUTECSH (op1) / INVPERMUTECSH (op1)

CALL PATH DEPENDENT AUTHENTICATION

BACKGROUND

Technical Field

The present technique relates to the field of data processing.

Technical Background

Some data processing systems may have mechanisms for guarding against potential attacks where an attacker may attempt to cause the processing circuitry to execute unauthorised sections of program code. One way of guarding against such attacks may be to prohibit writing of executable code to memory, so that only trusted software pre-installed in memory may be executed. However, even with such a restriction, a potential attack may involve code re-use, where snippets of legitimately executable code are strung together by subverting indirect branch instructions present in the code. For example, if an attacker modifies a value in a register which is used for generating a target address of a branch instruction, the attacker may be able to trick the processor into branching to an inappropriate point of code, for example to bypass certain sections of code which may provide security protections such as password checks or authentication operations.

SUMMARY

At least some examples provide an apparatus comprising:
processing circuitry to execute instructions; and
a call path identifier storage element to store a call path identifier, wherein in response to a calling instruction for calling a target function, the processing circuitry is configured to permute the call path identifier with a function return address to generate an updated call path identifier to be stored to the call path identifier storage element;
in response to an authentication code generating instruction identifying a first source value, the processing circuitry is configured to generate an authentication code dependent on the first source value and at least one modifier value; and
in response to an authentication code checking instruction identifying a second source value associated with a previously generated authentication code, the processing circuitry is configured to check whether the previously generated authentication code matches an expected authentication code dependent on the second source value and at least one modifier value, and to trigger an error handling response when a mismatch is detected between the previously generated authentication code and the expected authentication code;
wherein for at least one variant of the authentication code generating instruction and at least one variant of the authentication code checking instruction, said at least one modifier value comprises a value dependent on the call path identifier stored in the call path identifier storage element.

At least some examples provide a data processing method comprising:
in response to calling of a target function, permuting a call path identifier stored in a call path identifier storage element with a function return address to generate an updated call path identifier to be stored to the call path identifier storage element;
performing an authentication code generating operation on a first source value to generate an authentication code dependent on the first source value and at least one modifier value; and
performing an authentication code checking operation on a second source value associated with a previously generated authentication code, to check whether the previously generated authentication code matches an expected authentication code dependent on the second source value and at least one modifier value, and trigger an error handling response when a mismatch is detected between the previously generated authentication code and the expected authentication code;
wherein for at least one variant of the authentication code generating operation and at least one variant of the authentication code checking operation, said at least one modifier value comprises a value dependent on the call path identifier stored in the call path identifier storage element.

At least some examples provide a computer program to control a data processing apparatus to perform the method described above. The computer program may be stored on a recording medium. The recording medium may be a non-transitory recording medium.

At least some examples provide a computer program for controlling a host data processing apparatus to provide an instruction execution environment for execution of instructions, comprising:
processing program logic to control execution of the instructions in the instruction execution environment; and
a call path identifier data structure to store a call path identifier, wherein in response to a calling instruction for calling a target function, the processing program logic is configured to control the host data processing apparatus to permute the call path identifier with a function return address to generate an updated call path identifier to be stored to the call path identifier data structure;
in response to an authentication code generating instruction identifying a first source value, the processing program logic is configured to control the host data processing apparatus to generate an authentication code dependent on the first source value and at least one modifier value; and
in response to an authentication code checking instruction identifying a second source value associated with a previously generated authentication code, the processing program logic is configured to control the host data processing apparatus to check whether the previously generated authentication code matches an expected authentication code dependent on the second source value and at least one modifier value, and to trigger an error handling response when a mismatch is detected between the previously generated authentication code and the expected authentication code;
wherein for at least one variant of the authentication code generating instruction and at least one variant of the authentication code checking instruction, said at least one modifier value comprises a value dependent on the call path identifier stored in the call path identifier data structure.

The computer program for controlling the host data processing apparatus to provide the instruction execution environment may be stored on a recording medium. The recording medium may be a non-transitory recording medium.

Further aspects, features and advantages of the present technique will be apparent from the following description of examples, which is to be read in conjunction with the accompanying drawings.

DESCRIPTION OF EXAMPLES

Figure 1:
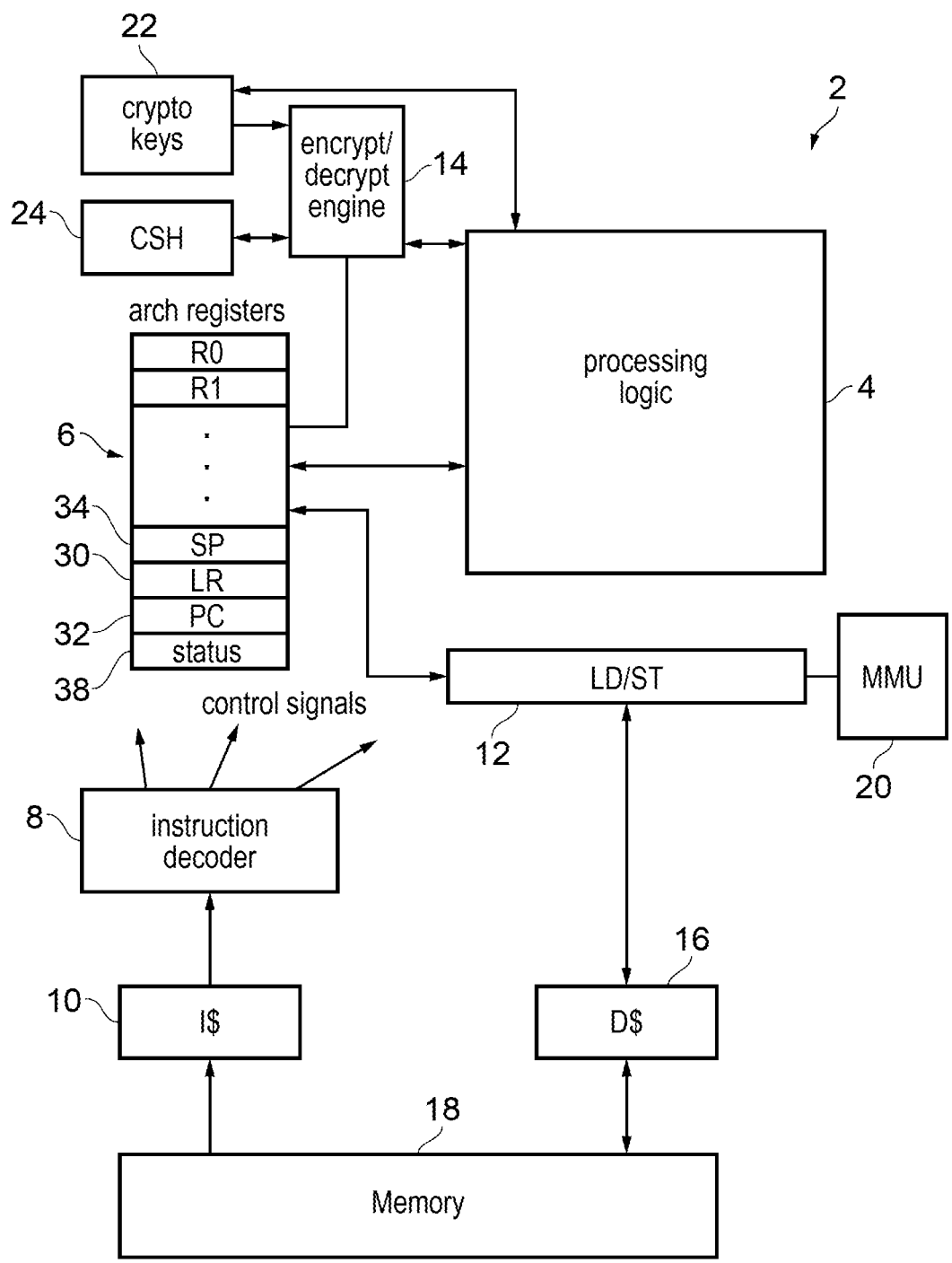
FIG. 1 schematically illustrates an example of a data processing apparatus.

An apparatus has processing circuitry to execute instructions, and a call path identifier storage element to store a call path identifier. In response to a calling instruction for calling a target function, the processing circuitry may permute the call path identifier with a function return address to generate an updated call path identifier to be stored to the call path identifier storage element. In response to an authentication code generating instruction identifying a first source value, the processing circuitry is configured to generate an authentication code which depends on the first source value and at least one modifier value. In response to an authentication code checking instruction identifying a second source value associated with a previously generated authentication code, the processing circuitry may check whether the previously generated authentication code matches an expected authentication code which depends on the second source value and at least one modifier value. The processing circuitry may trigger an error handling response when a mismatch is detected between the previously generated authentication code and the expected authentication code. For at least one variant of the authentication code generating instructing and at least one variant of the authentication code checking instruction, said at least one modifier value comprises a value which depends on the call path identifier stored in the call path identifier storage element.

This provides a technique for guarding against code re-use attacks. The call path identifier provides a record of the history of function calls which led to the current point of execution within a program. The authentication code generating instruction can be used at a point in the program where a value to be used as basis for generating a branch address is generated, and by generating an authentication code dependent on the first source value and a modifier value, this can be tied to some program context associated with the modifier value. By using the call path identifier as the modifier value for at least one variant of the authentication code generating instruction, this can provide a stronger means of tying use of the source value to a particular point in the program, since even if the same function is called by different routes taken through the program, the call path identifier may take different values depending on the history of function calls which lead to the current point of execution, and accordingly cases where certain function calls have been bypassed or a different route taken into a particular location in the program can be identified. Hence, at a point when the source value needs to be used, an authentication code checking instruction may specify that value as a second source value, and the previously generated authentication code for that second source value can be checked against an expected authentication code which depends on the second source value and the at least one modifier value, so that an error handling response can be triggered if the previously generated and expected authentication codes do not match. Hence, by using a call path identifier as a modifier for generating the authentication code, this can make it more difficult for an attacker to substitute data values which may be legitimate in one part of the code into a different part of the code.

In some examples, the value dependent on the call path identifier may simply be the call path identifier itself. Hence, the variants of the authentication code generating and checking instructions which use a modifier depending on the call path identifier could be applied directly to the call path identifier stored in the call path identifier storage element.

However, in other examples the value dependent on the call path identifier may comprise an encrypted version of the call path identifier. This can provide added security by reducing the chance that the call path identifier can be predicted, and reducing the risk of side channel information about the call path identifier being exposed which could reduce the number of permutations that an attacker would need to try to guess the call path identifier in a brute force attack.

In some example implementations, all versions of the authentication code generating instruction could generate the authentication code dependent on the call path identifier. Similarly, all versions of the authentication code checking instruction could use at least one modifier value which comprises the value dependent on the call path identifier.

However, in other examples, there may be different variants of the authentication code generating and checking instructions provided which could use different modifier values.

For example, a first variant of the authentication code generating instruction and a first variant of the authentication code checking instruction may use multiple modifier values, including both the call path identifier and a further modifier value. For example the further modifier value could comprise a stack pointer. This can provide further security by restricting use of the value for which the authentication code is generated to a particular part of the program code associated with a given value of the call path identifier and a given value of the stack pointer.

Also, a second variant of the authentication code generating instruction and a second variant of the authentication code checking instruction may be provided, in which the at least one modifier value comprises the value dependent on the call path identifier and is independent of a further modifier value which may be used for at least one other variant of the authentication code generating/checking instructions. For example, for the second variant, the value dependent on the call path identifier may be the only modifier used.

A further variant of the authentication code generating instruction and a further variant of the authentication code checking instruction could also be implemented where the at least one modifier value is independent of the call path identifier. Hence, different versions of the authentication code generating and checking instructions can be provided to allow the programmer or the compiler to select the extent to which use of a given source value is tied to a particular program context. For example, in some scenarios it may be desirable to allow value to be correctly authenticated even if there are multiple different routes by which a series of function calls can lead to the corresponding part of the program being executed, and in this case it may be preferable to select the further variant which uses a modifier other than the call path identifier so that authentication may still succeed even if different function call histories are invoked. For other parts of the program where there is a more predictable flow of function calls when the program is correctly executed, security can be increased by using a variant of the authentication code generating instruction which does use a modifier dependent on the call path identifier.

The different variants of the authentication code generating instruction or authentication code checking instruction could be distinguished in various ways. In one example, each variant of the authentication code generating instruction could have a different opcode. Alternatively, the different variants could share the same opcode but could have another field within the instruction decoding which specifies which variant of the authentication code generating instruction is used (e.g. a modifier field which identifies the type of modifier value to use). Similarly, the variants of the authentication code checking instruction could be distinguished by their opcode or by a further field within the instruction encoding.

However, in other examples a mode indicating value stored in a mode storage element may be used to distinguish the variants of the authentication code generating instruction or authentication code checking instruction. For example, when an authentication code generating instruction or authentication code checking instruction is executed when the mode indicating value has a first value, then the at least one modifier value may comprise the value dependent on the call path identifier. When the mode indication value has a second value, the authentication code generating/checking instruction may be executed with the at least one modifier value being independent of the call path identifier. This can avoid the need to allocate multiple instruction encodings for representing the two or more variants of the authentication code generating instruction or the two or more variants of the authentication code checking instruction. Instead, a single encoding could be used for all forms of the authentication code generating instruction (other than the bits which identify the source value itself). Similarly, the same encoding could be used for all variants of the authentication code checking instruction other than the bits identifying the second source value. This leaves other encodings of the instruction space free for indicating other types of operation, to provide a more efficient instruction set architecture encoding. Before executing an authentication code generating/checking instruction, another instruction may change the mode indicating value if necessary to control the subsequent authentication code generating/checking instruction to use the desired modifier value.

The authentication code could be generated for any value specified as a first source value by the authentication code generating instruction. However, it can be particularly useful to use this in cases where the first source value comprises a memory address. This enables subsequent branch instructions which rely on the memory address to generate the branch target address to be protected against code reuse where a different address is substituted into the address register. The authentication code generating instruction could be executed at the point when the address is first generated, or when the program context in which the address is allowed to be used is reached, in order to protect the address using the authentication code, and then the authentication code checking instruction could be executed at the point when the address is about to be used by a subsequent branch instruction for example.

When the authentication code is generated, it could be associated with the corresponding source value in any way. For example the authentication code could be stored in a further register alongside the first source value stored in a different register.

However, where the first source value comprises a memory address, it can be particularly useful for the processing circuitry to associate the authentication code with the address by replacing a subset of bits from the memory address with the generated authentication code. In some examples the subset of bits could comprise a certain number of least significant bits of the memory address. For example, if the address is known to be aligned to a certain power of two address boundary then it may be expected that a number of least significant bits of the address may be zero and so these can be replaced with the authentication code without loss of information. Alternatively, the replaced subset bits of the memory address could be a number of most significant bits or bits which are more significant than a certain threshold bit within the memory address. This can exploit the fact that although the processor architecture may support addresses with a certain number of bits (e.g. 64 bits), in practice in real world data processing devices there is not yet the need for a device with such a large amount of memory storage that the entire 64-bits address space is likely to be used. Hence, although the physical addresses may have 64 bits, in practice only a smaller number of bits may actually be used, with a number of most significant bits corresponding to zero. For example it can be relatively common in currently implemented processors for a 48-bit physical address space to be used so that the upper 16 bits of address are always zero. The 48-bit address space still provides 256 terabytes of memory which is sufficient for present day needs, but the instruction set architecture has implemented 64-bit address to give room for future expansion. Hence, as there a number of upper bits which are not in practice used, these bits can be replaced with the authentication code (the authentication code can be inserted into any subset of these unused bits at the upper end of the address).

Regardless of which particular bits of the memory address are replaced with the authentication code, this provides a convenient mechanism for ensuring that the authentication code is retained alongside the memory address to avoid the authentication code being lost or tampered with. Any transfer of the memory address to a different storage element would then inherently also transfer the corresponding authentication code, so that when the address is then subsequently used the authentication code is still present. In response to the authentication code checking instruction, the processing circuitry could then extract the authentication code from the relevant subset of bits of the memory address, and trigger the error handling response if there is a mismatch between the read authentication code and the expected authentication code. If there is a match between the extracted authentication code and the expected authentication code, then in response to the authentication code checking instruction the processing circuitry may then clear the authentication code by resetting the corresponding subset of bits to some default value (such as all zeros) before actually using the memory address for any subsequent branch or other instruction.

The exception handling response triggered in response to a mismatching authentication code may vary from implementation to implementation. In some cases the error handling response could comprise signalling an exception condition. An exception handler may then trigger the processing circuitry to respond to the detected authentication failure. For example, the exception could cause the current thread of processing to be aborted or processing to be directed to an operating system or other supervisory code for dealing with the potential security breach that has been detected.

However, where the second source value comprises a memory address, one form of error handling response may comprise changing the memory address to an invalid address. For example, in the case where a subset of bits in the memory address are replaced with the generated authentication code as discussed above (because not all bits of the memory address may in practice be used for representing real bits of the memory address), the error handling response could comprise setting a subset of those unused bits of the memory address to some value other than the default value which would normally appear in those unused bits for valid memory addresses. For example, where the addresses have X bits but only Y bits (Y<X) are used for valid addresses, one or more of the upper X-Y bits may be set to a non-zero value to represent an invalid address. This approach can be useful because it may reduce the amount of added error handling functionality needed to be provided in the processing apparatus. Typically, a processing apparatus may already have exceptions for dealing with memory faults when there is an attempt to branch to, or perform a load or store operation on, an invalid memory address. Hence, by changing the memory address to an invalid address when a mismatching authentication code is generated, the error need not explicitly be flagged in response to the authentication code checking instruction, but when the address is subsequently used for a load/store operation or a branch then the error may effectively be identified because a memory fault is triggered by the access to the invalid address. For example, existing memory fault triggering mechanisms associated with a memory protection unit or memory management unit could be used to generate the fault based on the invalid address resulting from the authentication code checking instruction when the authentication code mismatches.

The permutation function used to permute the call path identifier with the function return address in response to the calling instruction may be a reversible permutation function. Hence, in response to a function return instruction for triggering a return from the target function to previous processing, the processing circuitry may perform an inverse permutation function on the call path identifier stored in the call path identifier storage element and the function return address, to generate an updated call path identifier to be stored to the call path identifier storage element. Hence, this would mean that the call path values would be expected to match immediately before calling of a certain function and immediately after returning from that function, so that the system can have a consistent representation of the current location within the program code regardless of whether certain conditional functions are executed in the meantime. This may provide a more reliable way of enabling the authentication of source values using the authentication code generating/checking instructions.

A variety of functions could be used as the permutation function, but in some cases a cryptographic function may be used which relies on at least one call path permutation key. Hence, the processing circuitry may be configured to permute the call path identifier with the function return address using a cryptographic function performed in dependence on a call path permutation key. For example, the call path permutation function could be a block cipher. Use of a cryptographically strong function may be useful to reduce the risk of forgery of the call path identifier by an attacker. Alternatively, a call path permutation function which does not depend on a cryptographic key may be used, such as a cyclic redundancy check function.

Similarly, generation of the authentication code may also be based on a cryptographic function performed on the first source value and the at least one modifier value, where the cryptographic function is dependent on an authentication key value. The function performed to generate the expected authentication code in response to the authentication code checking instruction may also depend on the cryptographic function. While the authentication key value could be the same as the call path permutation key, security may be increased by using different keys as the call path permutation key and the authentication key respectively. In some cases, multiple versions of the authentication code generating instruction could be provided, which allows selection of different authentication key values from a set of multiple authentication key values available. For example, one authentication code generating instruction could be provided for generating authentication codes for address to be used for instruction data accesses or branches and a different variant of the authentication code generating instruction could select a different authentication key value when an authentication code is to be generated for a data access pointer. Hence in general some property of the authentication code generating instruction may select which authentication key value to use. Similarly the authentication code checking instruction may also have different versions for selecting different values as the authentication key.

A call path identifier save instruction may be provided for triggering the processing circuitry to save a value dependent on the call path identifier to a data store (e.g. to a stack data structure). In response to a corresponding call path identifier restore instruction, the processing circuitry may restore a value to the call path identifier storage element depending on the value read from the data store. This allows previous values of the call path identifier to be saved and restored so that even if there are multiple alternative sequences of function calls which may lead to a valid code entry point, a certain value of the call path identifier can still be restored in order to ensure consistent authentication of previously authenticated values using the authentication code.

To provide added security, in response to the call path identifier save instruction, the version of the call path identifier which is stored to the data store may be an encrypted version of the call path identifier, and decryption may be applied in response to the call path identifier restore instruction to decrypt the value read from the data store and store the decrypted value to the call path identifier store element. This avoids exposing the actual call path identifier to memory to reduce the chance of an attacker being able to guess or derive the call path permutation (hashing) function.

In some examples, in addition to permuting the call path identifier in response to function calls, a further call path identifier permute instruction could be implemented which triggers the processing circuitry to permute the call path identifier with a source operand specified by the call path identifier permute instruction, to generate an updated call path identifier to be stored to the call path identifier storage element. This allows the call path identifier to be permuted as if a function call was being performed even if no function call is actually being performed. This can allow program code to quickly calculate expected values of the call path identifier for certain series of function calls without actually needing to run the corresponding function code. To provide security, in some examples successful execution of the call path identifier permute instruction may be restricted to when the processing circuitry is operating at a certain privilege level which is higher than or equal to a threshold privilege level. If the call path identifier permute instruction is executed when a current privilege level is less than the threshold privilege level then successful execution of the call path identifier may be prevented (e.g. by ignoring the call path identifier permute instruction or by triggering an exception). Similarly, a corresponding call path identifier inverse permute instruction can be provided for applying the inverse permutation based on a return address specified by the inverse permute instruction, to simulate function returns, even when no function return is actually being performed.

In some examples the technique discussed above may be implemented in hardware. For example, a hardware storage element may be provided as the call path identifier storage element, circuit logic implemented in hardware may be used to permute the call path identifier in response to calling of a target function. The data processing system may have instruction decoder support for the authentication code generating and checking instructions. Hence, in response to these instructions, the instruction decoder may control the processing circuitry to perform the corresponding operations to generate and check the authentication code respectively.

However, in other examples such operations may be controlled in software using program code executed on a general purpose computer which may not have the hardware elements supporting the call path identifier permutations and the authentication code generation and checking. Hence, in some cases a computer program may be provided to control a data processing apparatus to perform the call path identifier permutation in response to calling the target function, and to perform the authentication code generating and checking operations.

In another example, a simulator may be provided, comprising a computer program for execution on a host data processing apparatus which need not itself have hardware supporting the call path identifier permutations and the authentication code generating and checking features. The simulator program emulates a processor which does have these features, so that program code intended to run on such a hardware-implemented processor can still function correctly, even when executing on a host data processing apparatus which does not have the hardware features required. Hence, a computer program may be provided for controlling a host data processing apparatus to provide an instruction execution environment for execution of instructions, in which processing program logic controls execution of the instructions in the instruction execution environment. The computer program may provide a call path identifier data structure to store a call path identifier, and processing program logic which responds to calling instruction for calling a target function by permuting the call path identifier with the function return address to generate an updated call path identifier to be stored to the call path identifier data structure. Similarly, in response to an authentication code generating instruction, the processing program logic controls the host data processing apparatus to generate the authentication code, and in response to the authentication code checking instruction the processing program logic controls the host data processing apparatus to check whether the previously generated authentication code matches the expected authentication code and to trigger the error handling response if a mismatch is detected. Again, for at least one variant of the authentication code generating instruction or authentication code checking instruction, the modifier value may comprise a value depending on the call path identifier.

FIG. 1 illustrates an example of a data processing apparatus 2 comprising processing logic 4 for executing data processing operations. For example, the processing logic may include execution units for executing various types of processing operations. The execution units may for example include an arithmetic/logic unit (ALU) for carrying out arithmetic or logical operations such as add, multiply, AND, OR, etc., a floating point unit for performing floating point operations on floating point operands, or a vector processing unit for performing vector processing on vector operands comprising multiple data elements. A set of architectural registers 6 is provided for storing operands for the instructions executed by the processing logic and for storing the results of the executed instructions. An instruction decoder 8 decodes instructions fetched from an instruction hash 10 to generate control signals for controlling the processing logic 4 or other elements of the data processing apparatus (such as a load store unit 12 or encryption/decryption engine 14), to perform the operations represented by the decoded instructions. The load/store unit 12 is provided to perform load operations to load a data value from a data hash 16 or memory 18 into the architectural registers 6, or store operations to store a data value from the architectural registers 6 to the data hash 16 or memory 18. A memory management unit 20 is provided to perform address translations for the addresses used for the load/store operations. The memory management unit 20 may include a translation lookaside buffer (TLB) for caching portions of page tables from memory 18 which define the address mappings to be used for different portions of the address space and define access permissions, such as a permission setting whether certain pages of the address space are readable or writeable, or setting which privilege levels of the processing circuitry 4 are allowed to access a particular page.

The encryption/decryption engine 14 is provided for performing cryptographic algorithms on data values to encrypt or decrypt data or apply cryptographic hash functions, which depend on cryptographic keys stored in key storage 22. The cryptographic algorithms may be applied to general data values read from the architectural registers 6 or to a call path identifier (or Call Stack Hash) stored in a call path identifier storage element 24 (CSH register). The keys used by the encryption/decryption engine 14 may be randomised keys generated per-session, so that an attacker cannot reuse correctly encrypted or hashed from one session during another session.

Figure 2:
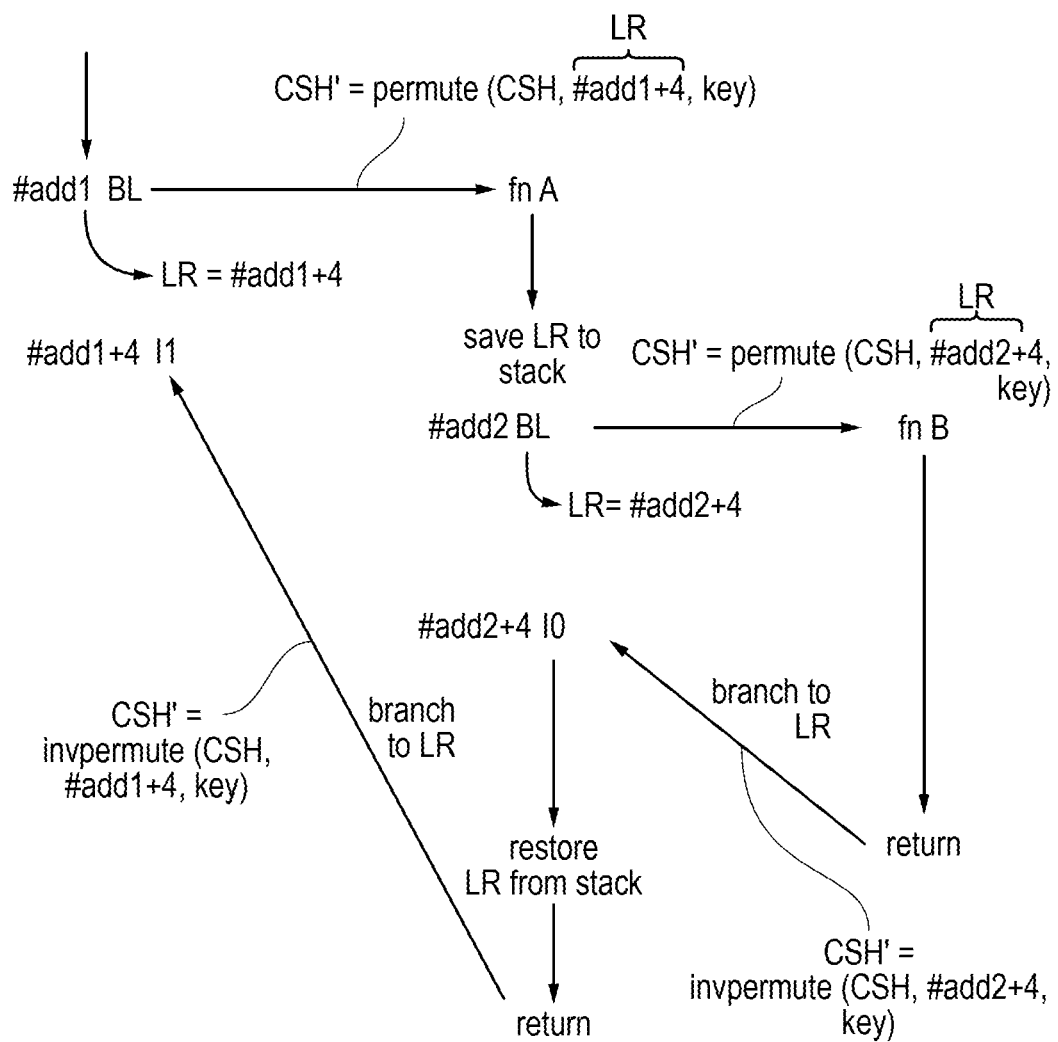
FIG. 2 illustrates use of a call path identifier.

FIG. 2 illustrates use of the call path identifier (CSH). Unlike the architectural registers 6, the CSH register 24 is a hidden register maintained by the processor core which is not architecturally visible to software. As shown in FIG. 2, the CSH is permuted on a function call based on the return address of the calling instruction which called the function, and is permuted inversely on a function return using the same function return address, to return back to its previous value. Hence, the CSH acts as a signature representing the currently processed function within the context of whatever series of function calls led to calling of that function.

For example, in FIG. 2 functions are called using a branch-with-link instruction (BL), in response to which the function return address is stored into a link register 30 within the architectural registers 6. The function return address may for example be set to the address of the next instruction following the function calling branch instruction itself. Also in response to the BL instruction, a program counter register 32 indicating a current point of program execution is updated to a branch target address corresponding to the start of the function code to be executed. The branch target address could be specified by the encoding of the BL instruction, or in a register.

In response to the function calling instruction BL the encryption/decryption engine 14 permutes the current value of the Call Stack Hash 24 with the function return address and a Call Stack Hashing key read from the cryptographic key storage 22, and writes the results in value back to the CSH register 24.

If within the first called function (function A) a further function calling instruction (branch with link instruction BL) is encountered, then in response to this function call the CSH is again permuted with the function return address of the calling instruction corresponding to the second function call and the permutation key, as part of the process for calling a further function B. The permutation may be such that the updated Call Stack Hash resulting from calling of function B may have a different value when function B is called from within function A than if function B had been called from within a different function (e.g. if the initial permutation performed in response to calling of function A was omitted then the calling of function B would lead to a different result). By using a cryptographic hash function with a sufficient number of bits to make it computationally infeasible to guess the value of the Call Stack Hash without having access to the cryptographic key, this provides a strong technique for identifying the current location of the code and the history of past function calls used to reach that location.

The permutation function used for hashing the CSH is a reversible function so that a given iteration of the permutation function can be undone by executing a corresponding inverse permutation function. On returning from a given function, the inverse permutation function may be applied to the current value of the Call Stack Hash 24 using the same permutation key as used on a function call and the function return address read from the link register 30. To support nesting of functions, the contents of the link register 30 may be saved to the stack by software before the next nested function is called, so that the link register can be overwritten with the function return address of the new function in response to a subsequent function calling instruction (BL). Similarly, the software may include an instruction to restore the previous value to the link register from the stack before executing the function return for a nested function. For functions which do not call further nested functions, no such saving/restoring of the link register is required. Hence, even when returning from function B, the previous value of the return address associated with function A may be restored to the link register 30, and so at each function return, the Call Stack Hash permutation can be unwound by applying the inverse permutation. Therefore, provided the software correctly handles saving/restoring of the link register for nested function calls, when returning to function A the Call Stack Hash would have the same value as it did before function B was called, and when returning to the background processing the Call Stack Hash returns to the same value that it had before function A was called. If an attacker attempts to trick code into branching into a different location of code by changing the return address in the link register 30, this may lead to a mismatch between the Call Stack Hash before and after calling of the function, which could lead to authentication operations as discussed below failing and hence the attack being detected.

For example, the CSH permutation function could be a 128-bit block cipher with a 64-bit tweak. The return address is used as the tweak.

Another example of the CSH permutation function, based on a cyclic redundancy check (CRC) algorithm is shown below:

```
1:    uint32_t call(uint32_t crc, uint32_t new_lr) {
2:        crc ^= new_lr
3:        for (int i = 0; i < 32; i++)
4:            crc = (crc & 1) ? (crc >> 1) ^ POLY : (crc >> 1);
5:        return crc;
6:    }
```

The algorithm takes the previous value of the CRC (crc) and the function return address (e.g. the link register value—new_lr) and returns a hash of the two inputs (in this example no cryptographic key is required for performing the hash). At line 2, the previous value of the crc is exclusive-ORed (XOR'd) using the new link register value. As will be appreciated by the skilled person, the XOR operation is reversible. In other words A XOR B XOR B returns A. Lines 3 and 4 iterate through the bits of the crc, performing a "XOR division" using a polynomial (POLY). Given that the end result, which is returned in line 5, corresponds with a remainder of the "XOR division" operation using the polynomial, it will be appreciated that the output will be less than the polynomial. Accordingly, there is a greater chance of a collision occurring (two inputs having the same output) when a smaller polynomial is used. The task of selecting a suitable polynomial will be known to the skilled person.

The inverse permutation function corresponding to this example is as follows:

```
1:    uint32_t ret(uint32_t crc, uint32_t new_pc) {
2:        for (int i = 0; i < 32; i++)
3:            crc = (crc & 0x80000000) ? (crc << 1) ^ RPOLY : (crc << 1);
4:        crc ^= new_pc;
5:        return crc;
6:    }
```

The inputs to the function are the crc and new_pc, which is the new program counter after the function call returns (or, alternatively, the value of the link register immediately before the function call returns). Lines 2 and 3 of the algorithm iterate through the bits of the crc. At each iteration, if the bit being considered is a '1' then a left shift occurs and the result is XORed with RPOLY, otherwise a left shift occurs. Once this is done, at line 4, the end result is XORed with new_pc to give the result. The value RPOLY is a derivative of POLY, which is used to form the CRC in the first place. In particular, RPOLY is the result of left shifting POLY by one bit.

POLY in the above implementations disregards the least significant bit, and RPOLY disregards the most significant bit. Hence, for a polynomial of the form 1abcdef1, POLY is '1 abcdef' and RPOLY is 'abcdef1'. In other words, for a 32-bit polynomial:

RPOLY=(POLY*2+1) & 0xffffffff;

It will be appreciated that these are just some examples of functions that could be used for hashing the call stack identifier based on the function return address. Other functions could also be used.

Figure 3A:
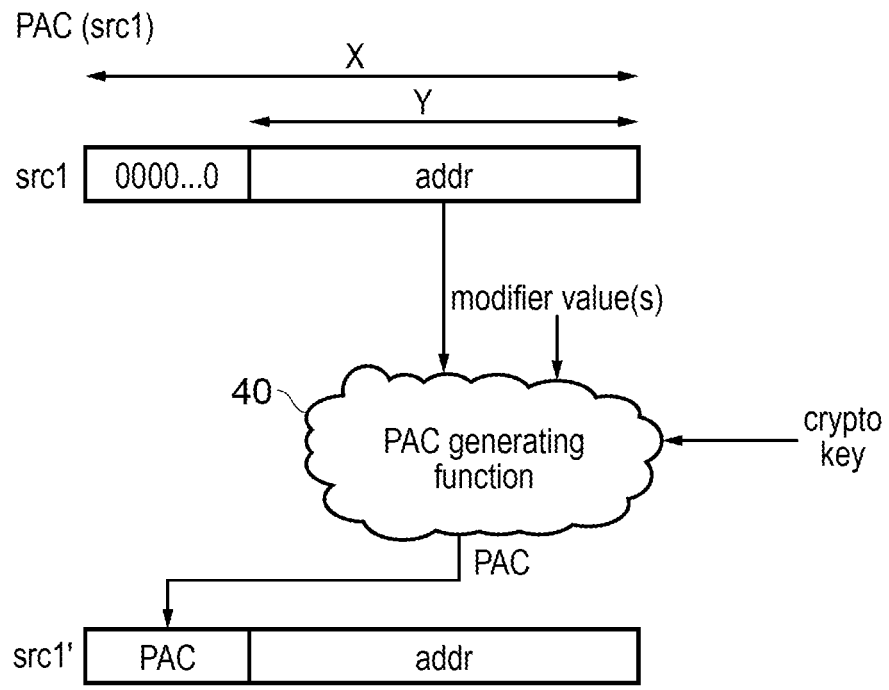
FIGS. 3A and 3B illustrate an example of an authentication code generating instruction and an authentication code checking instruction respectively.

FIG. 3A illustrates an example of an authentication code generation operation performed in response to an authentication code generating instruction PAC. The PAC instruction specifies a first source operand src1. The source operand can be any value but it is particularly useful to apply the authentication code generating operation to address pointers. The source operand may specify an address which comprises a certain number of bits X, but in practice only a certain number Y of those bits may be used for valid addresses (e.g. X may equal 64 and Y may equal 48). Hence, X-Y upper bits of address may by default would be set to zero.

In response to the authentication code generating instruction PAC, the source operand may be passed to the encryption/decryption engine 14 which may apply authentication code generating function 40 to the first source value based on a cryptographic key read from the cryptographic key storage 22 and at least one modifier value. The resulting authentication code (PAC) is inserted into the unused upper bits of the pointer address to generate the result of the instruction. The result may for example be written back to the same register which stored the source operand. The authentication code generating function 40 may use a cryptographic hash function which makes it computationally infeasible to guess the authentication code associated with a particular address without knowledge of the function used or the cryptographic key.

Figure 3B:
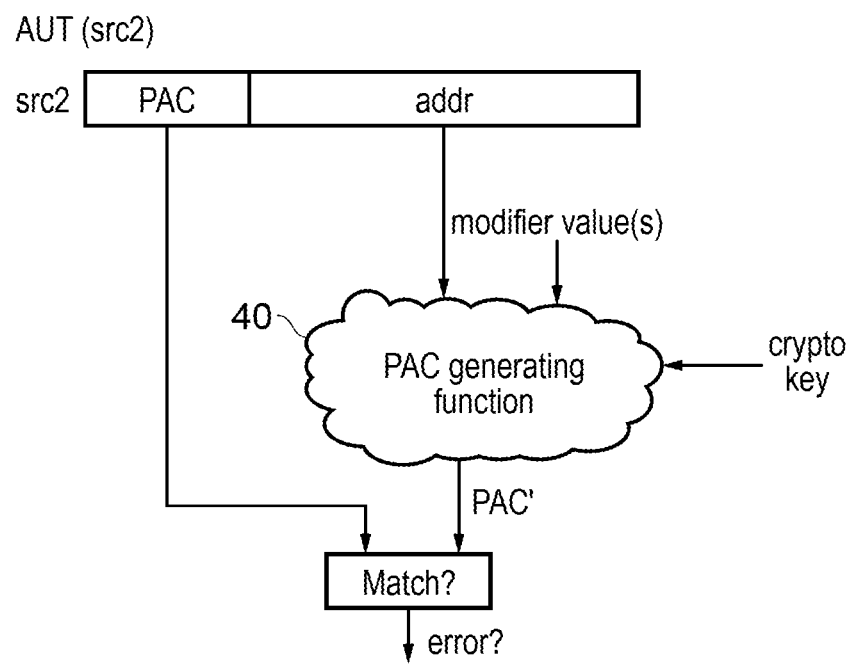

FIG. 3B shows a corresponding authentication code checking instruction AUT which specifies a second source operand src2. The second source operand is expected to be a pointer address which has previously been authenticated by inserting the authentication code PAC into its upper bits in response to the PAC instruction shown in FIG. 3A, but if an attacker has modified the pointer the authentication code may not be valid. In response to the authentication check instruction, the instruction decoder 8 controls the processing logic 4 and encryption/decryption engine 14 to apply the same authentication code generating function 40 to the address bits of the second source operand (excluding the authentication code PAC), using corresponding cryptographic key and modifier values to the ones used when the code was generated. The expected authentication code PAC' is then compared with the previously generated authentication code PAC extracted from the upper bits of the second source operand src2 and it is determined whether the expected authentication code and previously generated authentication code match. If so then processing is allowed to continue, while if there is a mismatch between the expected and previously generated codes then an error handling response is triggered, for example triggering an exception or setting the upper bits of the source register to a value which corresponds to an invalid address so that a subsequent access to that address would trigger the MMU 20 to trigger a memory fault because of accessing an invalid address for which no address mapping has been defined in the page tables.

By using the authentication code generating and checking instructions of FIGS. 3A and 3B, this allows pointers to be authenticated so that is more difficult for an attacker to inject an unauthorised pointer and successfully cause code to branch to a location identified by that pointer. By using a cryptographic function as the authentication code generating function 40 this can make brute force guessing of the authentication code associated with a particular address difficult. The authentication code generating instruction PAC can be included in the code at the point when a pointer address is generated and the authentication code checking instruction AUT can be included later when the address is actually to be used, to double check the authentication code before actually branching to the address.

The authentication code generating function 40 may vary from implementation to implementation. For example, Borghoff et al., "PRINCE—a low-latency block cipher for pervasive computing applications.", International Conference on the Theory and Application of Cryptology and Information Security. Springer, Berlin, Heidelberg, 2012, proposes a block cipher. Jean et al., "Tweaks and keys for block ciphers: the TWEAKEY framework." International Conference on the Theory and Application of Cryptology and Information Security. Springer, Berlin, Heidelberg, 2014, describes the TWEAKEY framework, a framework for making a cipher tweakable so that it may depend on a second input in addition to the message being enciphered and the cryptographic key. Hence, in one example, the authentication code generating function may comprise the PRINCE cipher modified based on the TWEAKEY framework to be tweakable using the modifier value as the second input. It will be appreciated that further modifications to the PRINCE-TWEAKEY cipher could be made while remaining within the scope of the claims. Also, in other examples entirely different cryptographic ciphers could be used as the authentication code generating function 40, depending on the balance between security and hardware/software implementation cost required for a given system implementation.

Different variants of the PAC and AUT instructions may use different forms of the modifier values which provide a tweak to the cryptographic function used to generate the authentication code. This can be exploited so that the modifier values used can be values which are specific to a particular region of the program code to reduce the chance that an attacker would be able to read correctly authenticated pointers from one part of the program code and then reuse them later in the program code to cause a branch to a particular pointer address which is not an expected valid transition for that particular part of the program.

For example, in some variants the modifier value could correspond to the contents of a stack pointer register 34 within the architectural registers 6, which indicates the location of a stack in memory 18 for storing temporary variables such as the link register values providing the function return addresses which are saved/restored during nested function calls as shown in FIG. 2. For example, the stack pointer register 34 may be updated in response to context switches or transitions between privilege levels (or which register among several stack pointer registers implemented in hardware is referenced to provide the currently active stack pointer may be varied), and so by using the stack pointer as the modifier value this can restrict correct authentication of pointers to particular context within a program.

Figure 4A:
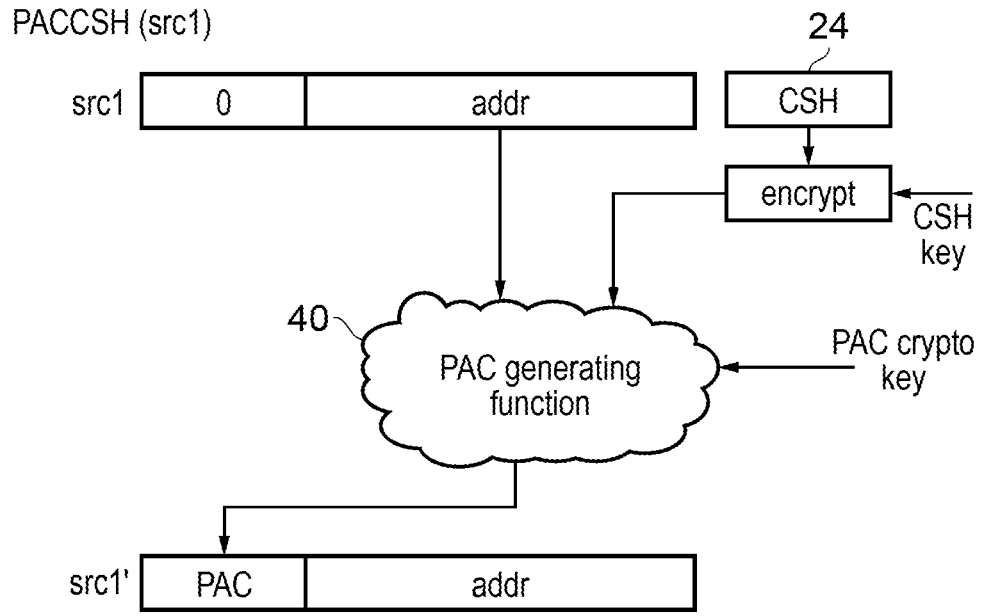
FIGS. 4A and 4B illustrate examples of the authentication code generating and checking instructions in which a modifier value is dependent on the call path identifier.
Figure 4B:
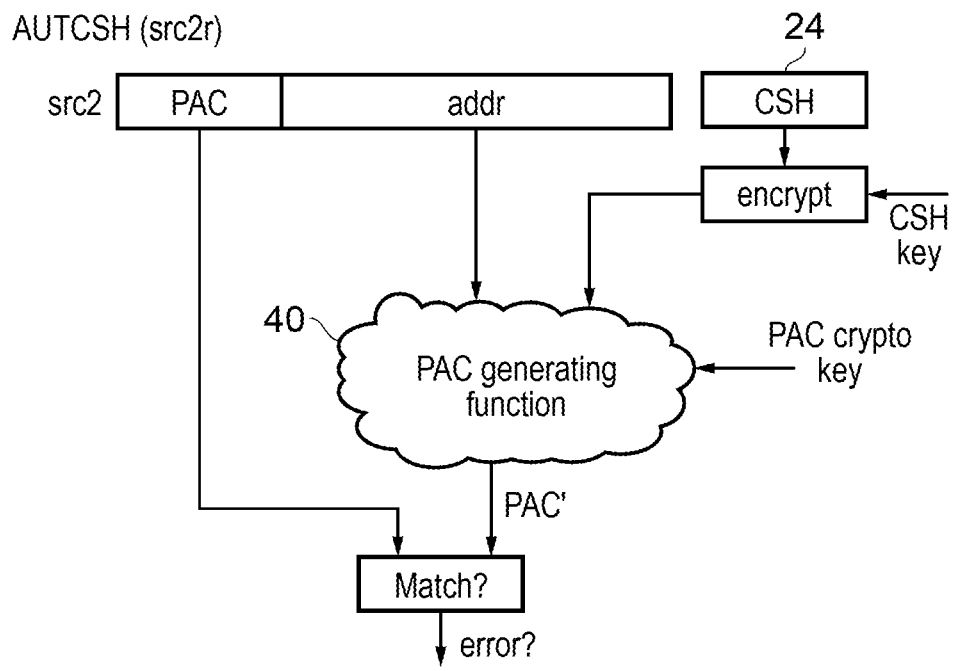

FIGS. 4A and 4B illustrate another variant of the PAC and AUT instructions in which the modifier value is dependent on the call stack hash maintained in the CSH register 24. In these examples the modifier comprises an encrypted version of the call stack hash generated by encryption/decryption engine 14. The encryption key used to encrypt the CSH may be a different key to the cryptographic key used for the authentication code generating function 40. The encryption key could be the same as the encryption key used for the call stack hash permutations as shown in FIG. 2. Alternatively, the encryption key used when encrypting the call stack hash 24 for the purpose of pointer authentications may be different to the key used for normal permutations of the call stack hash on function calls. In general, by providing variants of the instruction which use the call stack hash as a basis for generating the modifier used for the authentication code generating function 40, this provides a strong technique for restricting the use of certain address pointers to particular parts of the program code. Given the wide variety of routes by which processing may arrive at a particular function within the program code, using the call stack hash as the modifier for the authentication code generating function allows more detailed pinpointing of particular regions of code used by the stack pointer, especially as the number of potential values for the stack pointer within programs tends to be more limited than the number of potential values for the call stack hash 24. This can make it more difficult for an attacker to substitute authenticated pointers from one function context into another, even if the attacker was able to modify the stack pointer 34 or capture stack pointers from other functions at the same stack depth.

In the examples of FIGS. 4A and 4B, the call stack hash is the only modifier used, but it would also be possible for some variants of the instructions to use multiple modifiers so that the call stack hash is used alongside an additional modifier such as the stack pointer 34.

Figure 5A:
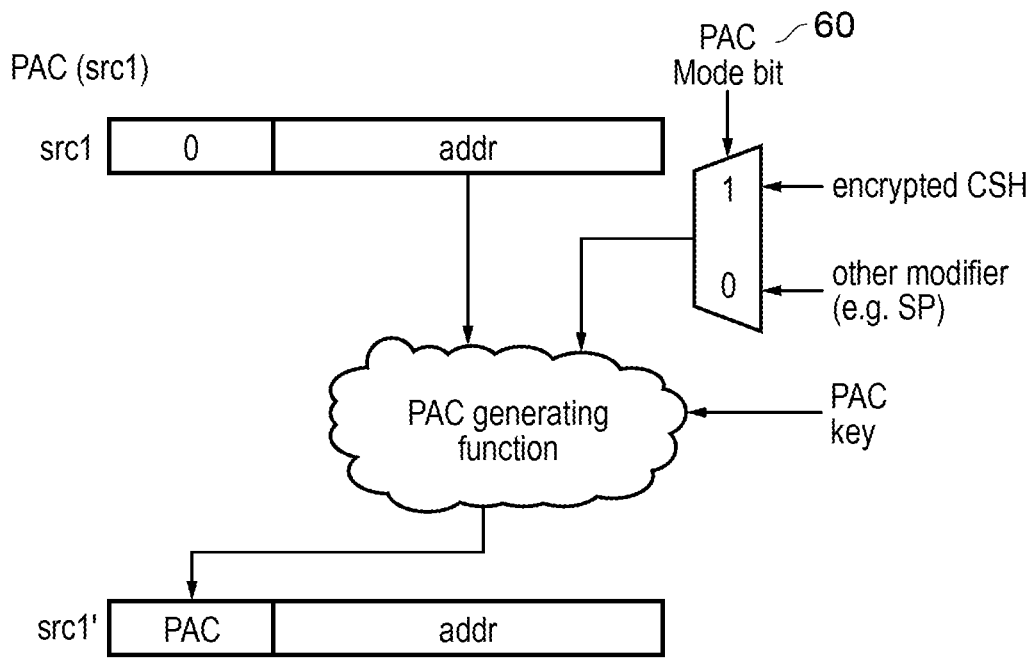
FIGS. 5A and 5B illustrate examples of the authentication code generating and checking instructions where a mode indicating value controls selection of the modifier value.
Figure 5B:
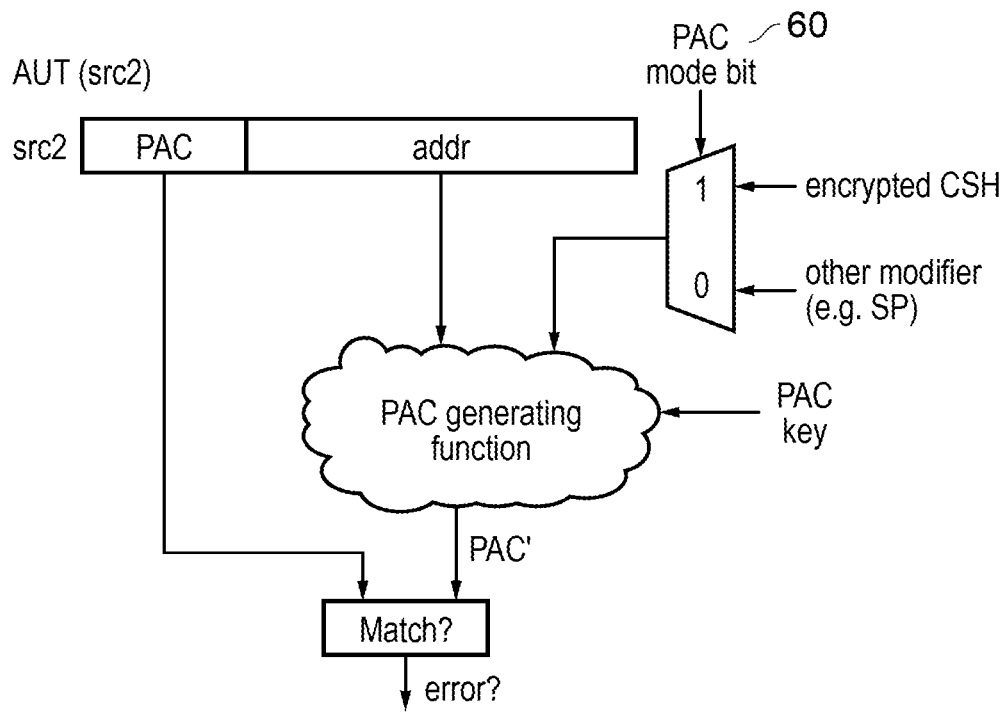

FIGS. 5A and 5B show an example in which a mode bit 60 stored within a status register 38 within the architectural state 6 is used to control which type of modifier is used for the PAC and AUT instructions. For example when the mode bit has a first value (e.g. one) then the encrypted call stack hash is used as the modifier and when the mode bit is zero then another modifier such as the stack pointer 34 is used. Otherwise the instructions behave in the same way as the examples of FIGS. 3A to 4B.

Figure 6A:
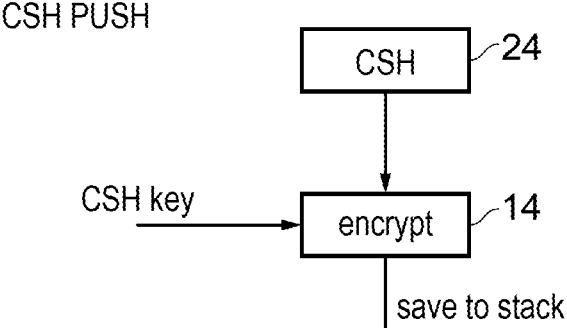
FIGS. 6A and 6B illustrate an example of call path identifier save and restore instructions respectively.
Figure 6B:
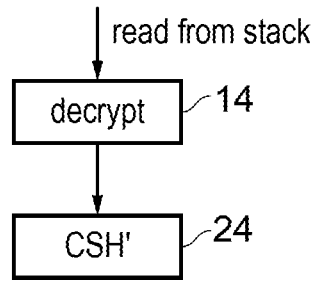

As shown in FIG. 6A, the current value of the call stack hash may be saved from the CSH register 24 to memory 18 (e.g. within a stack storage structure), in response to a CSH save instruction decoded by the instruction decoder 8. The version of the CSH which is saved to memory may be an encrypted version generated by the encryption/decryption engine 14 based on the call stack hash key. This avoids exposure of the raw call stack hash. Similarly, as shown in FIG. 6B a call stack hash restore instruction may trigger the previously saved call stack hash to be read from the stack or other location in memory, decrypted by the encryption/decryption engine 14 and then restored to the CSH register 24.

Figure 7:
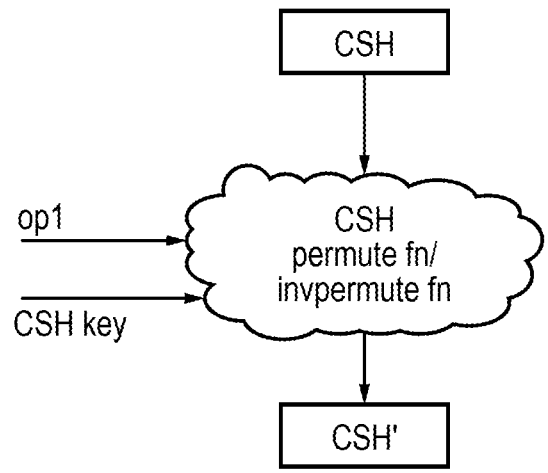
FIG. 7 shows an example of a call path identifier permute instruction.

As shown in FIG. 7, the instruction decoder 8 may also support a call stack hash permute instruction or call stack hash inverse permute instruction which specifies a source operand op1 and controls the processing logic 4 and encryption/decryption engine 14 to apply the call stack hash permutation function or inverse permutation function to the specified source operand op1 using the call stack hash key read from the cryptographic key storage 22, to generate an updated call stack hash value which is stored back to the call stack hash register 24. The source operand op1 may be read from one of the general purpose architectural registers in the architectural state 6. This instruction enables program code to simulate calling of functions and function returns in order to obtain the corresponding call stack hash that would be expected to result from such a function. In some cases the call stack hash permute or inverse permute instructions may be restricted to executing only at certain privilege levels of the processor.

Figure 8:
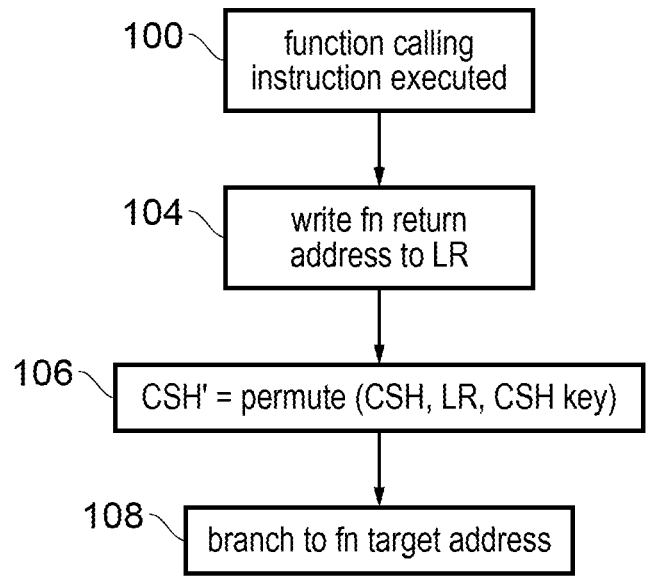
FIG. 8 is a flow diagram illustrating a method of permuting the call path identifier in response to a function call.

FIG. 8 is a flow diagram illustrating a method of handling function calls. At step 100, a function calling instruction is executed, for triggering the processing logic 4 to branch to processing of a function. In some cases the function calling instruction may specify arguments to be passed to the function. The function calling instruction may specify a function return address to which processing should return after the processing of the function is completed, or more commonly the function return address may by default be set to be the address of the next instruction following the function calling instruction. At step 104, the function return address for the function call is stored to the link register 30 to overwrite the previous contents. If the previous contents of the link register 30 needed to be retained (e.g. because processing is already within a previously called function and the next function call is of a nested function within that previously called function), then the software may execute an instruction to save the link register contents to the stack before executing the function calling instruction. At step 106 the encryption/decryption engine 14 permutes the call stack hash register 24 with the new contents of the link register and the call stack hash encryption key read from cryptographic key storage 22, to generate a new value CSH' which is stored back to the CHS register 24. At step 108, the program counter register 32 is updated based on the target address of the function call, to control the processing logic 4 to branch to processing of the instruction identified by the function's target address. Processing then continues within the function.

Figure 9:
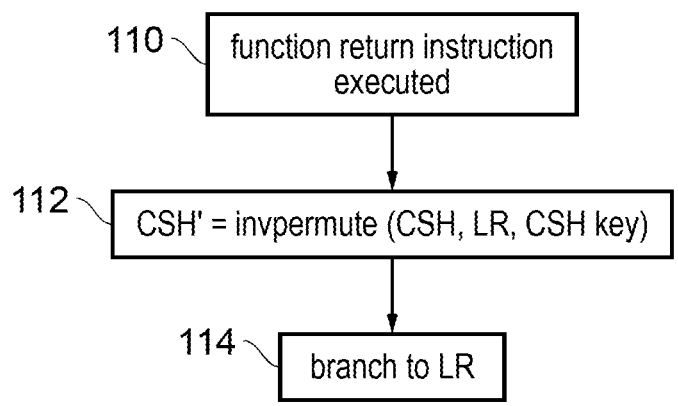
FIG. 9 shows a flow diagram illustrating a method of reversing the permutation of the call path identifier in response to a function return.

FIG. 9 shows a method of processing a return from processing of a function. At step 110 a function return instruction is executed (optionally, following execution of an instruction to restore the appropriate function return address from the stack to the link register 30). At step 112 the encryption/decryption engine 40 applies the inverse permutation to the permutation function performed at step 106 of FIG. 8, to transform the current value of the call stack hash 24 back to the value it had before the current function was called. The inverse permutation function is applied to call stack value 24, the current contents of the link register 30 (which provides the function return address for the function) and the call stack hash key read from the storage 22, and writes the results to the CSH register 24. At step 114 the program counter 32 is updated to branch to the address represented in the link register.

Figure 10:
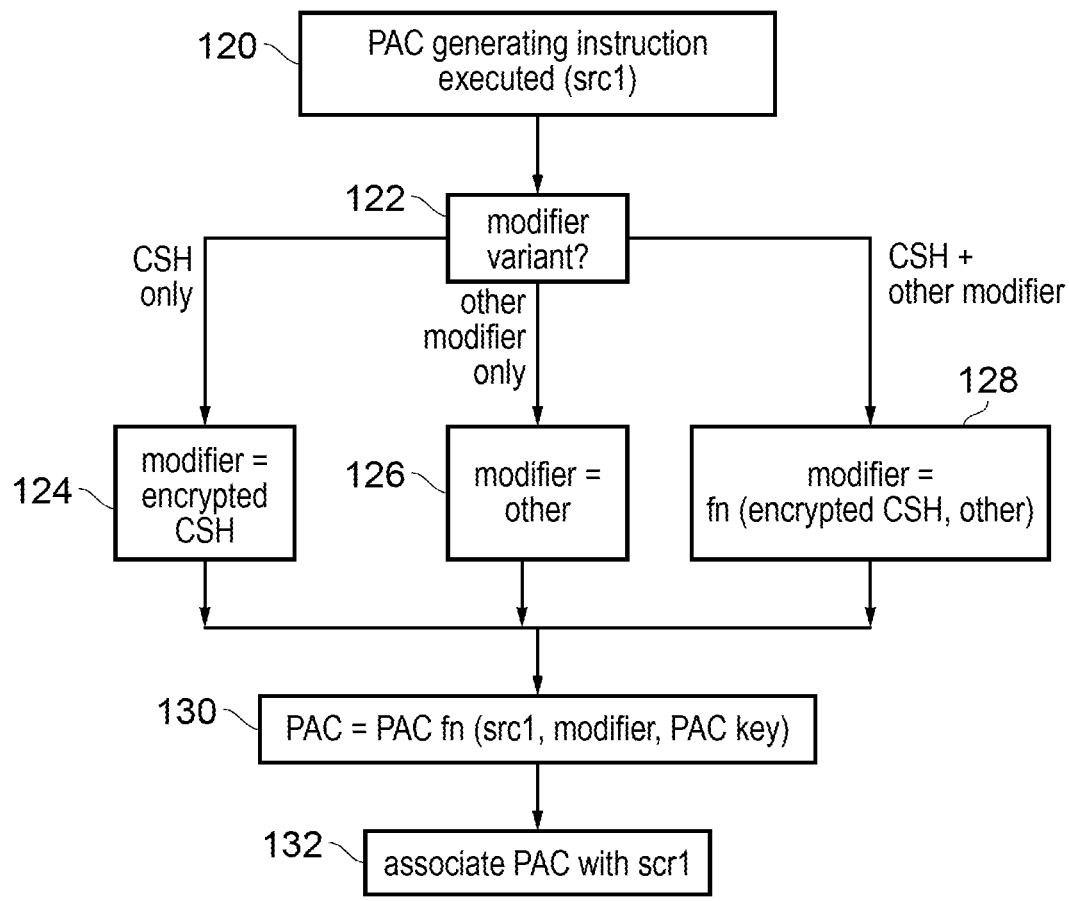
FIG. 10 is a flow diagram illustrating a method of processing an authentication code generating instruction.

FIG. 10 shows a method of processing an authentication code generating instruction. At step 120 an authentication code generating instruction is executed, which specifies a first source operand. At step 122, the variant of the authentication code generating instruction is identified to determine which modifier value to use. That is, during the decoding of the authentication code generating instruction decoder 8 may provide control signals which activate processing paths in the processing logic to select the appropriate modifier. Alternatively, a mode value within a status register 38 may indicate the modifier variant to be used. Depending on the variant, one of steps 124, 126 or 128 is performed to determine the modifier as the encrypted call stack hash value (step 124), another modifier value, such as the stack pointer 34 (step 126), or a function of the encrypted call stack hash and another modifier value (step 128). In some cases the modifier may not be the absolute value corresponding to the encrypted call stack hash or other modifier but could be some function derived from these values. Regardless of which modifier is selected, at step 130 the encryption engine 14 applies an authentication code generating function to the source value specified by the instruction, the selected modifier and an authentication code generating encryption key. The resulting authentication code is associated with the source value at step 132 (e.g. by replacing upper bits of the source address with the authentication code as discussed above).

Figure 11:
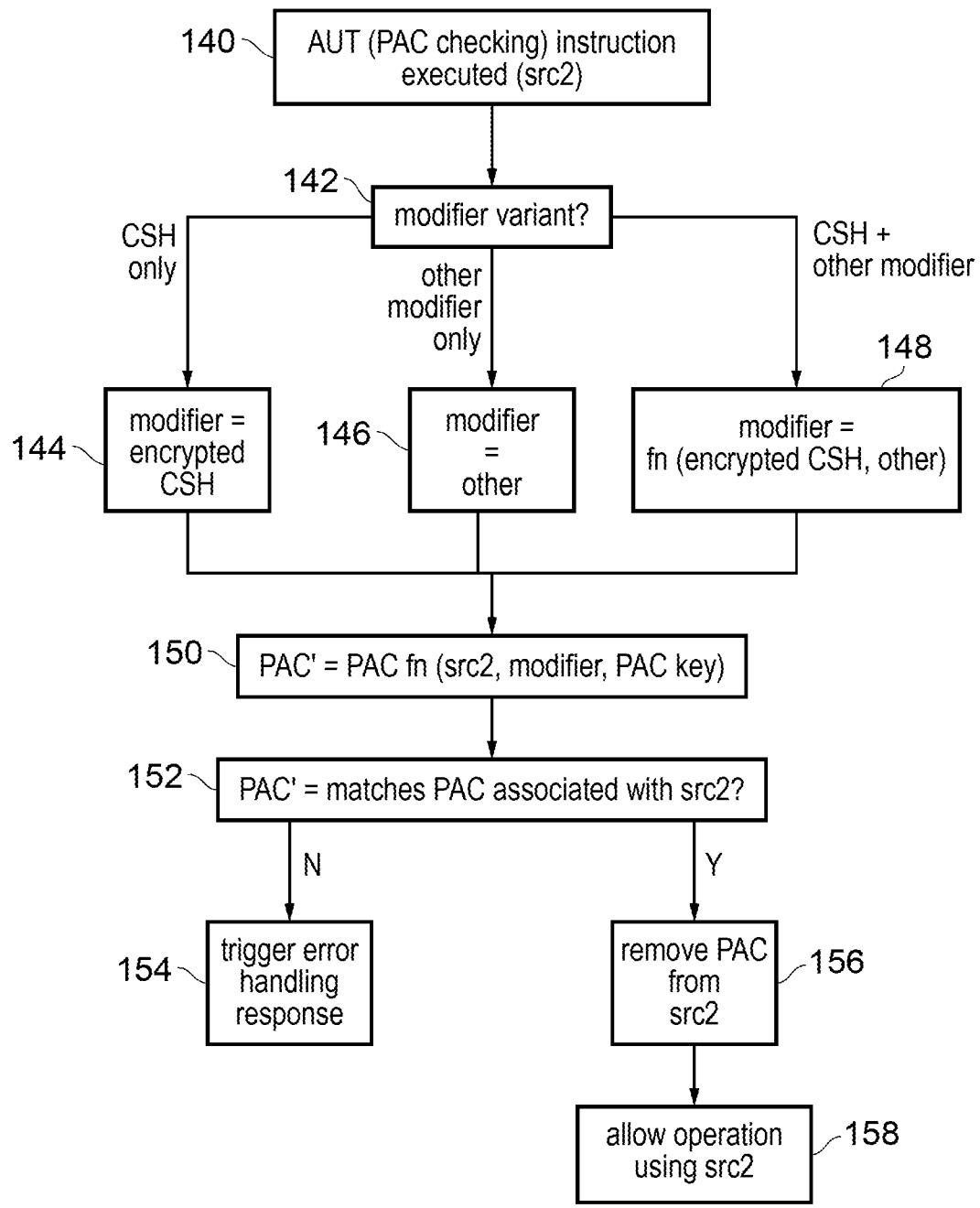
FIG. 11 is a flow diagram illustrating a method of processing an authentication code checking instruction.

FIG. 11 is a flow diagram showing a method of processing of an authentication code checking instruction. At step 140 an authentication code checking instruction is executed, which specifies the second source operand. At step 142 the modifier variant of the instruction is identified in a similar way to step 122 of FIG. 10. Depending on which variant is provided, the modifier is determined to be one of a function of the encrypted call stack hash, a function of another modifier value such as the stack pointer, or a function of both encrypted call stack hash and the other modifier value, at steps 144, 146, 148 respectively. Regardless of which modifier is used at step 150, an expected authentication code PAC' is generated using the corresponding function to step 130 of FIG. 10 and based on the selected modifier. At step 152 the processing logic 4 determines whether the generated expected authentication code PAC' matches the previously generated authentication code PAC which is associated with the second source operand src2 of the instruction (e.g. PAC may extracted from the upper bits of the address as discussed above). In the case of a mismatching authentication code, an error handling response is triggered at step 154. When the codes match then at step 156 the authentication code is removed from the second source value, e.g. by clearing the upper address bits to zero, and then at step 158 any subsequent operation which uses the second source value may be allowed to proceed.

In summary, a hidden register may be maintained by the processor core, which is permuted on each function call based on the return address of that call, and permuted inversely on the return using the same address, back to its previous value. So long as the return address for the call and return agree in value, the register is stable within a function and acts as a signature representing that function within the context of whatever process called it. If there is a mismatch between the versions of the return address seen at function call and function return, then the permutation may give an incorrect result and all subsequent permutations may be incorrect (this may for example be used to detect an attacker attempting to subvert the intended program flow by modifying the return address during processing of a function). Both application level function calls and supervisor code function calls may be integrated into the call stack hash. The call stack permutation function may be a 128-bit block cipher with a 64-bit tweak. The return address is used as the tweak, and the call stack hash is fed in and encrypted/decrypted as needed, and written back to the call stack hash register. The kernel (operating system) may set up the encryption key and keep it hidden from the application.

On a request from software (by executing an authentication code generating instruction as discussed above), the contents of the call stack register may be mixed, in a cryptographic way, with an argument for software (the first source operand of the authentication code generating instruction). For example, the argument may be the stack pointer or the function return address. When these values are re-loaded for use at a later point of the program, they may be authenticated against the combined signature. If any of the values involved (the saved pointer, the stack pointer or the function signature) are modified, authentication would fail and the pointer may be made unusable so that the application will fault.

Software access to read the call stack hash (CSH) and combine it with another parameter may be made through software instructions specifying two scalar registers for the transfer (read or write) and a third for the tweak. The CSH value may be fed through the same block cipher as for calls and returns, but using an alternate key used specifically for instruction access. This key may again be configured by the kernel and kept secret. This interface is used to save/restore the CSH for thread switches, etc. and also in some implementations to extract a modifier value for the authentication code generation/checking instructions. Use of a different key guards against the possibility of application software trying to use this interface to wind fake calls into or out of the hash.

Another instruction allows the call stack hash to be permuted as if by calls or returns, but using a register operand specifying the return address. These instructions allow modification to CSH directly be software. This instruction may be restricted to require kernel privileges, or alternatively it may be left available to application software to integrate additional software parameters into CSH temporarily (e.g. validating saved registers during a thread switch). The CSH permute or inverse permute instructions may use the alternate key described above. The kernel can temporarily set the alternate key to match the call key while it does its calculations. This allows the kernel to quickly calculate the expected value of a CSH at run-time based on external data.

FIG. 1 shows an example of a data processing apparatus with hardware resources for supporting the generation of the call stack hash and the authentication code generation and checking. For example, these hardware resources may include the instruction decoder 8, the call stack hash register 24, and the encryption/decryption engine 14. However, the method shown in FIGS. 8 to 11 could also be implemented using general purpose software executing on a general purpose processor.

Figure 12:
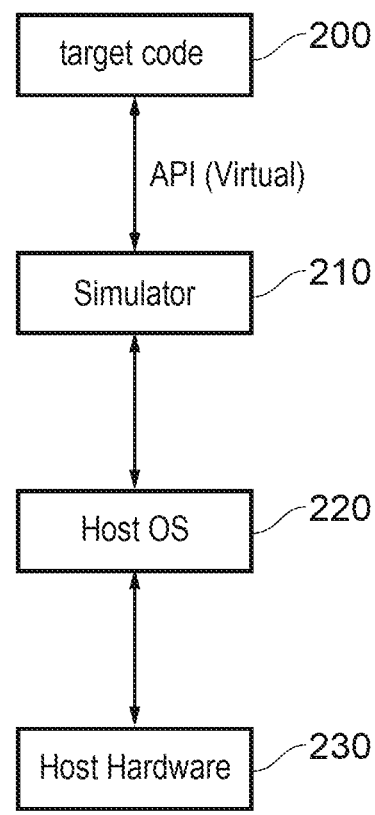
FIG. 12 illustrates a simulator implementation that may be used.

FIG. 12 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or hash, may be implemented in a simulated embodiment as a software data structure. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium (which may be a non-transitory medium), and provides a program interface (instruction execution environment) to the target code 200 (which may include applications, operating systems and a hypervisor) which is the same as the application program interface of the hardware architecture being modelled by the simulator program 210. Thus, the program instructions of the target code 200, including function calling instructions and authentication code generating/checking instructions described above, may be executed from within the instruction execution environment using the simulator program 210, so that a host computer 230 which does not actually have the hardware features of the apparatus 2 discussed above can emulate these features.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An apparatus comprising:
processing circuitry to execute instructions; and
a call path identifier register to store a call path identifier dependent on a series of function return addresses corresponding to a history of function calls,
wherein in response to a calling instruction for calling a target function, the processing circuitry is configured to permute the call path identifier with a function return address using a reversible permutation function to generate an updated call path identifier to be stored to the call path identifier register, and
in response to a function return instruction for triggering a return from the target function to previous processing, the processing circuitry is configured to perform an inverse permutation function on the call path identifier stored in the call path identifier register and the function return address, to generate an updated call path identifier to be stored to the call path identifier register;
in response to an authentication code generating instruction identifying a first source value other than the call path identifier, the processing circuitry is configured to generate, dependent on the first source value and at least one modifier value, an authentication code for protecting the first source value; and
in response to an authentication code checking instruction identifying a second source value associated with a previously generated authentication code, the processing circuitry is configured to check whether the previously generated authentication code matches an expected authentication code dependent on the second source value and at least one modifier value, and to trigger an error handling response when a mismatch is detected between the previously generated authentication code and the expected authentication code;
wherein for at least one variant of the authentication code generating instruction and at least one variant of the authentication code checking instruction, said at least one modifier value comprises a value dependent on the call path identifier stored in the call path identifier register, so that the authentication code for protecting the first source value other than the call path identifier is tied to the series of function return addresses corresponding to the history of function calls.

2. The apparatus according to claim 1, wherein said value dependent on the call path identifier comprises an encrypted version of the call path identifier.

3. The apparatus according to claim 1, wherein for a first variant of the authentication code generating instruction and a first variant of the authentication code checking instruction, said at least one modifier value comprises said value dependent on the call path identifier and a further modifier value.

4. The apparatus according to claim 3, wherein said further modifier value comprises a stack pointer.

5. The apparatus according to claim 1, wherein for a second variant of the authentication code generating instruction and a second variant of the authentication code checking instruction, said at least one modifier value comprises said value dependent on the call path identifier and is independent of a further modifier value used as one of said at least one modifier value for at least one other variant of the authentication code generating instruction and at least one other variant of the authentication code checking instruction.

6. The apparatus according to claim 1, wherein for a further variant of the authentication code generating instruction and a further variant of the authentication code checking instruction, said at least one modifier value is independent of said call path identifier.

7. The apparatus according to claim 1, comprises a mode storage element to store a mode indicating value;
wherein for an authentication code generating instruction or authentication code checking instruction executed when the mode indicating value has a first value, said at least one modifier value comprises said value dependent on the call path identifier; and
for an authentication code generating instruction or authentication code checking instruction executed when the mode indicating value has a second value, said at least one modifier value is independent of said call path identifier.

8. The apparatus according to claim 1, wherein said first source value comprises a memory address, and in response to the authentication code generating instruction the processing circuitry is configured to replace a subset of bits of the memory address with the generated authentication code.

9. The apparatus according to claim 1, wherein said second source value comprises a memory address, and the error handling response comprises changing the memory address to an invalid address.

10. The apparatus according to claim 1, wherein the error handling response comprises signalling an exception condition.

11. The apparatus according to claim 1, wherein the processing circuitry is configured to generate the authentication code by performing a cryptographic function on the first source value and said at least one modifier value, where the cryptographic function is dependent on an authentication key value.

12. The apparatus according to claim 11, wherein the processing circuitry is configured to select the authentication key value from among a plurality of authentication key values dependent on a property of the authentication code generating instruction.

13. The apparatus according to claim 1, wherein in response to a call path identifier save instruction, the processing circuitry is configured to save a value dependent on the call path identifier to a data store; and
in response to call path identifier restore instruction, the processing circuitry is configured to restore a value to the call path identifier register dependent on a value read from the data store.

14. The apparatus according to claim 13, wherein in response to the call path identifier save instruction, the processing circuitry is configured to save an encrypted version of the call path identifier to the data store; and
in response to the call path identifier restore instruction, the processing circuitry is configured to decrypt the value read from the data store and store the decrypted value to the call path identifier register.

15. The apparatus according to claim 1, wherein in response to a call path identifier permute instruction other than the calling instruction, the processing circuitry is configured to permute the call path identifier with a source operand specified by the call path identifier permute instruction, to generate an updated call path identifier to be stored to the call path identifier register.

16. The apparatus according to claim 15, wherein the processing circuitry is configured to operate at one of a plurality of privilege levels; and
the processing circuitry is configured to prevent successful execution of the call path identifier permute instruction when a current privilege level of the processing circuitry is less than a threshold privilege level.

17. A data processing method comprising:
storing, in a call path identifier register, a call path identifier dependent on a series of function return addresses corresponding to a history of function calls;
in response to calling of a target function, permuting the call path identifier with a function return address using a reversible permutation function to generate an updated call path identifier to be stored to the call path identifier register;
in response to a function return instruction for triggering a return from the target function to previous processing, performing an inverse permutation function on the call path identifier stored in the call path identifier register and the function return address, to generate an updated call path identifier to be stored to the call path identifier register;
performing an authentication code generating operation on a first source value other than the call path identifier to generate, dependent on the first source value and at least one modifier value, an authentication code for protecting the first source value; and
performing an authentication code checking operation on a second source value associated with a previously generated authentication code, to check whether the previously generated authentication code matches an expected authentication code dependent on the second source value and at least one modifier value, and trigger an error handling response when a mismatch is detected between the previously generated authentication code and the expected authentication code;
wherein for at least one variant of the authentication code generating operation and at least one variant of the authentication code checking operation, said at least one modifier value comprises a value dependent on the call path identifier stored in the call path identifier register, so that the authentication code for protecting the first source value other than the call path identifier is tied to the series of function return addresses corresponding to the history of function calls.

18. A non-transitory computer readable medium storing program instructions that, when executed, control a data processing apparatus to perform the method of claim 17.

19. A non-transitory computer readable medium storing program instructions that, when executed, control a host data processing apparatus to provide an instruction execution environment for execution of instructions, comprising:
processing program logic to control execution of the instructions in the instruction execution environment; and
wherein in response to a calling instruction for calling a target function, the processing program logic is configured to control the host data processing apparatus to permute a call path identifier stored in a call path identifier register-simulating data structure with a function return address using a reversible permutation function to generate an updated call path identifier to be stored to the call path identifier register-simulating data structure;
in response to a function return instruction for triggering a return from the target function to previous processing, the processing circuitry is configured to perform an inverse permutation function on the call path identifier stored in the call path identifier register-simulating data structure and the function return address, to generate an updated call path identifier to be stored to the call path identifier register-simulating data structure;
in response to an authentication code generating instruction identifying a first source value other than the call path identifier, the processing program logic is configured to control the host data processing apparatus to generate, dependent on the first source value and at least one modifier value, an authentication code for protecting the first source value; and
in response to an authentication code checking instruction identifying a second source value associated with a previously generated authentication code, the processing program logic is configured to control the host data processing apparatus to check whether the previously generated authentication code matches an expected authentication code dependent on the second source value and at least one modifier value, and to trigger an error handling response when a mismatch is detected between the previously generated authentication code and the expected authentication code;

wherein for at least one variant of the authentication code generating instruction and at least one variant of the authentication code checking instruction, said at least one modifier value comprises a value dependent on the call path identifier stored in the call path identifier register-simulating data structure, so that the authentication code for protecting the first source value other than the call path identifier is tied to the series of function return addresses corresponding to the history of function calls.

* * * * *